United States Patent
Doetsch et al.

(10) Patent No.: US 6,859,489 B2
(45) Date of Patent: Feb. 22, 2005

(54) METHOD AND DEVICE FOR DETERMINING THE CARRIER FREQUENCY OF BASE STATIONS IN THE MOBILE RECEIVER OF A CELLULAR MOBILE RADIO SYSTEM WORKING WITH W-CDMA

(75) Inventors: Markus Doetsch, Schliern (CH); Peter Jung, Otterberg (DE); Tideya Kella, München (DE); Jörg Plechinger, München (DE); Peter Schmidt, Ellerstadt (DE); Michael Schneider, München (DE)

(73) Assignee: Infineon Technologies AG, Munich (DE)

( * ) Notice: Subject to any disclaimer, the term of this patent is extended or adjusted under 35 U.S.C. 154(b) by 93 days.

(21) Appl. No.: 10/198,311

(22) Filed: Jul. 18, 2002

(65) Prior Publication Data

US 2003/0012268 A1 Jan. 16, 2003

Related U.S. Application Data

(63) Continuation of application No. PCT/DE01/00153, filed on Jan. 15, 2001.

(30) Foreign Application Priority Data

Jan. 18, 2000 (DE) .......................................... 100 01 854

(51) Int. Cl.$^7$ ............................................... H04B 1/707
(52) U.S. Cl. ...................................... 375/149; 375/137
(58) Field of Search .............................. 375/130, 136, 375/137, 147, 149, 150, 152, 343, 340, 316

(56) References Cited

U.S. PATENT DOCUMENTS 5,950,131 A 9/1999 Vilmur 6,385,264 B1 * 5/2002 Terasawa et al. ........... 375/371
6,567,482 B1 * 5/2003 Popovic' ..................... 375/343

FOREIGN PATENT DOCUMENTS

| EP | 0 540 808 A2 | 5/1993 |
| EP | 0 892 528 A2 | 1/1999 |
| WO | WO 98/36580 | 8/1998 |
| WO | WO 99/12273 | 3/1999 |
| WO | WO 99/12295 | 3/1999 |

OTHER PUBLICATIONS

Samukic, A.: "UMTS Universal Mobile Telecommunications System: Development of Standards for the Third Generation", IEEE Transactions on Vehicular Technology, vol. 47, No. 4, Nov. 1998, pp. 1099–1104.

Jung, P.: "Analyse und Entwurf digitaler Mobilfunksysteme" [Analysis and Layout of Digital Mobil Radio Systems], B. G. Teubner Verlag, 1997, pp. 12–25 and 122–140.

Dahlman, E. et al.: "WCDMA–The Radio Interface for Future Mobile Multimedia Communications", IEEE Transactions on Vehicular Technology, vol. 47, No. 4, Nov. 1998, pp. 1105–1118.

* cited by examiner

*Primary Examiner*—Kevin M Burd
(74) *Attorney, Agent, or Firm*—Laurence A. Greenberg; Werner H. Stemer; Gregory L. Mayback

(57) ABSTRACT

The method and device enable determining the carrier frequency of base stations in the mobile receiver of a cellular mobile radio system working with W-CDMA. The carrier frequency of the primary synchronization channel of the strongest received base station is first searched for by carrying out a non-coherent correlation of the received signal with the primary synchronization code over a very large number of code elements of the signal.

8 Claims, 5 Drawing Sheets

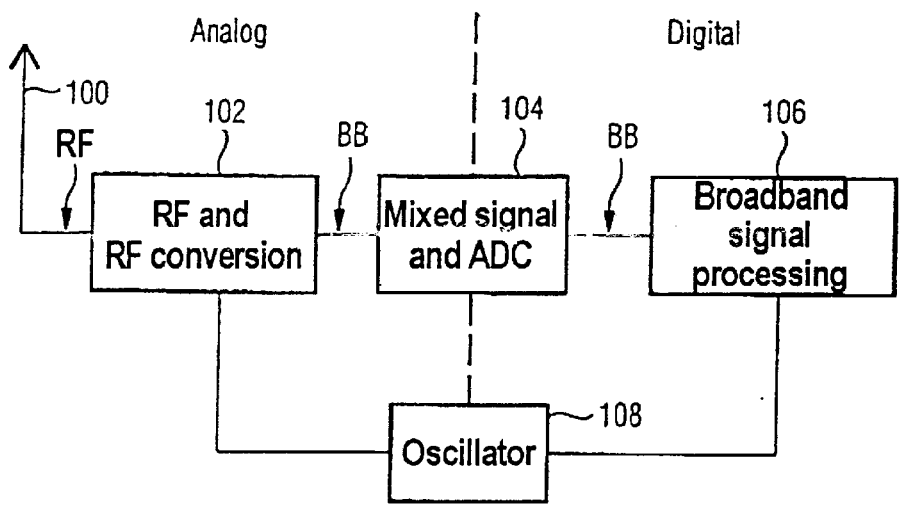
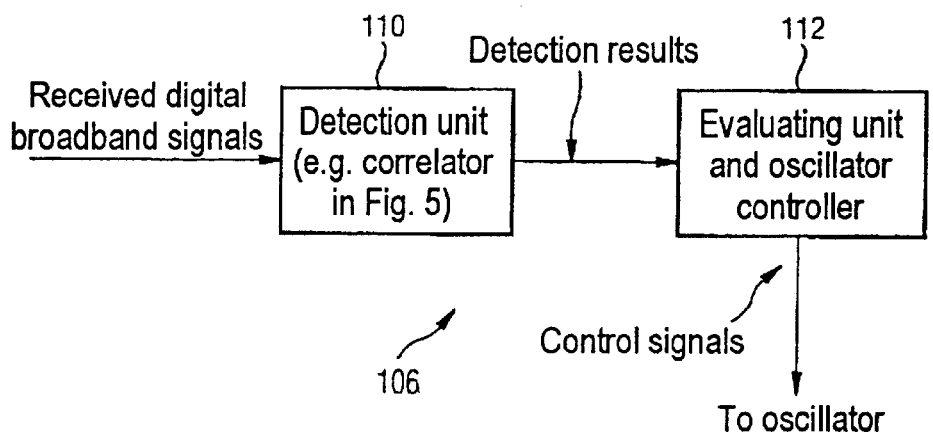

METHOD AND DEVICE FOR DETERMINING THE CARRIER FREQUENCY OF BASE STATIONS IN THE MOBILE RECEIVER OF A CELLULAR MOBILE RADIO SYSTEM WORKING WITH W-CDMA

CROSS-REFERENCE TO RELATED APPLICATION

This application is a continuation of copending International Application No. PCT/DE01/00153, filed Jan. 15, 2001, which designated the United States and was not published in English.

BACKGROUND OF THE INVENTION

1. Field of the Invention

The present invention relates to a method and to a device for determining the carrier frequency of base stations in the mobile receiver of a cellular mobile radio system working with W-CDMA.

The present invention relates to mobile receivers for cellular mobile radio systems with W-CDMA (wide-band code division multiple access) as described in detail in the literature, for example in P.Jung "Analyse und Entwurf digitaler Mobilfunksysteme" (Analysis and Design of Digital Mobile Radio Systems", B. G.Täubner-Verlag, Stuttgart, 1997 and in the journal IEEE Transactions on vehicular technology, Vol. 47, No.4 of November 1998 in the article "W-CDMA—The radio interface for future mobile multi-media communications". This method is of considerable significance because it is intended to form the world-wide standard for the third-generation mobile telephony technology as explained in IEEE Transactions on vehicular technology, Vol. 47, No. 4 of November 1998 in the article "UMTS universal mobile telecommunications system: Development of standards for the third generation".

In this novel operating method for the mobile telephony, the problem occurs that when the mobile receiver is switched on the first time, it has no information on the frequency and the timing of the transmissions of the surrounding base stations. The mobile receiver, therefore, must perform an initial cell search in order to determine the base station with the strongest received signals and the associated time synchronization of that base station. This task is one of the most difficult and computing-time-consuming tasks for the mobile receiver in a W-CDMA mobile radio system.

SUMMARY OF THE INVENTION

It is accordingly an object of the invention to provide a method and device for determining the carrier frequency of base stations in the mobile receiver of a cellular mobile radio system working with W-CDMA, which overcomes the above-mentioned disadvantages of the heretofore-known devices and methods of this general type and which provides for a method and a device for the most advantageous search, from the point of view of expenditure, for the carrier frequency of the base station to which the mobile receiver is to synchronize itself.

With the foregoing and other objects in view there is provided, in accordance with the invention, a method of determining a carrier frequency of base stations in a mobile receiver of a cellular mobile radio system working with W-CDMA. The method comprises first searching for the carrier frequency of a primary synchronization channel and a time synchronization of the base stations by carrying out a non-coherent correlation of an in-phase component and quadrature component of a received signal with a primary synchronization code over a very large number of chips of the signal.

In other words, the invention achieves the object in that firstly the carrier frequency of the primary synchronization channel and the time synchronization of the strongest received base station is searched for by performing a non-coherent correlation of the in-phase and quadrature component of the received signal with the primary synchronization code of a very large number of chips of the signal.

In accordance with a particularly preferred embodiment, the time synchronization of the strongest received base station is obtained modulo the slot length by determining the maximum value of the peaks in the output signal of the correlation.

It is particularly preferred to carry out the search for the primary synchronization channel (pSCH) first in coarse frequency steps, the energy of the correlation result being measured at intervals of in each case about 1 MHz and then the band having the highest energy is selected and this is measured at intervals of in each case about 100 KHz and again the band having the highest energy is selected which is then measured at intervals of in each case about 10 KHz and the value having the highest energy is selected as the hypothesis for the receiver carrier frequency. In this manner, the carrier frequency of the primary synchronization channel (pSCH) can be determined in a particularly fast and simple manner.

In accordance with a particularly preferred embodiment, the correlation is carried out over 2560 chips of the signal.

It is also particularly preferred to determine, after determining the carrier frequency of the primary synchronization channel and the time synchronization of the strongest received base station, the frame synchronization and the code group of this base station by means of the secondary synchronization channel.

With the above and other objects in view there is also provided, in accordance with the invention, a device for determining a carrier frequency of base stations for a mobile receiver of a cellular mobile radio system working with W-CDMA, which comprises at least one search device having means for demodulating a physical common primary control channel, means for correlating various path delays, means for identifying a scrambling code, means for determining a time frame synchronization, and means for estimating the signal delay.

It is particularly preferred, in accordance with a concomitant feature of the invention, if two such search devices are provided in the mobile receiver according to the invention.

Other features which are considered as characteristic for the invention are set forth in the appended claims.

Although the invention is illustrated and described herein as embodied in a method and device for determining the carrier frequency of base stations in the mobile receiver of a cellular mobile radio system working with W-CDMA, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 shows a simplified basic circuit diagram of a frequency acquisition system according to the invention;

FIG. 4 shows a simplified diagrammatic representation of the broadband signal processing of FIG. 3.

DESCRIPTION OF THE PREFERRED EMBODIMENTS

Figure 1:
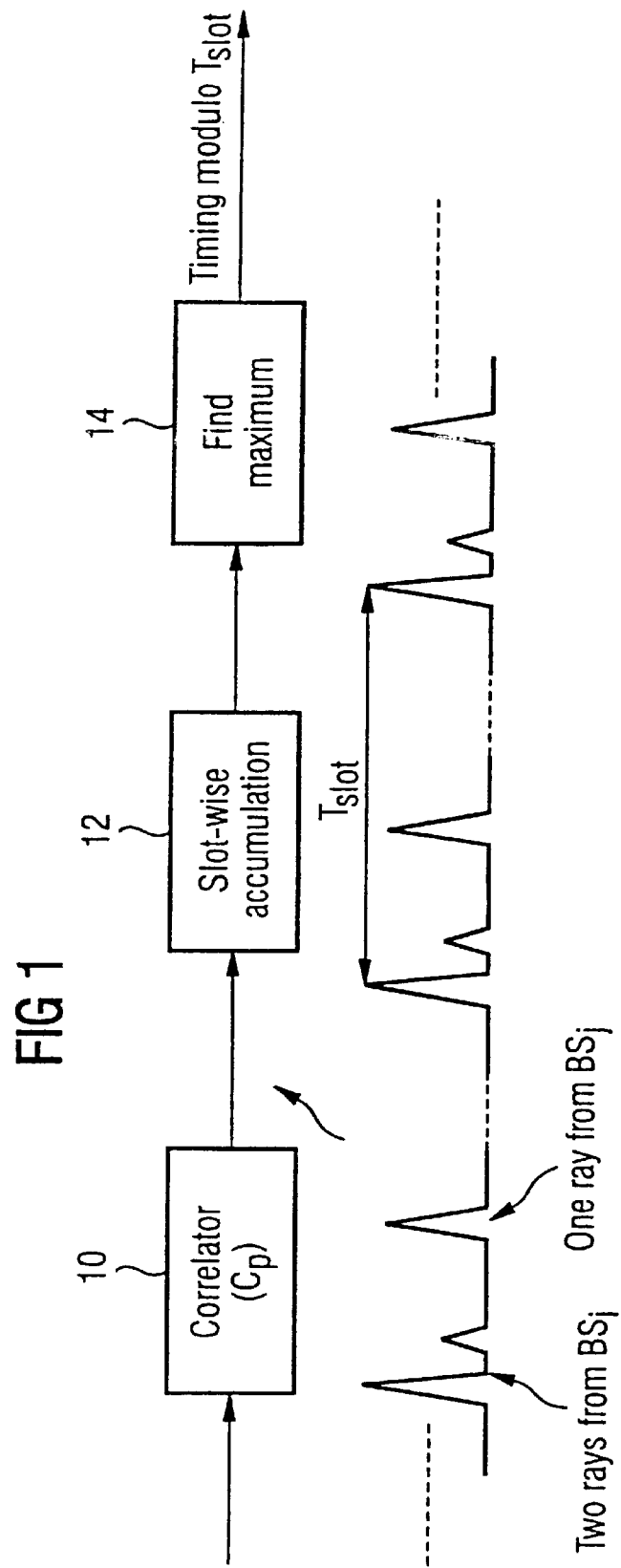
FIG. 1 shows a diagrammatic representation of the search for the primary synchronization code by means of correlation.

The present invention deals with the problem that a mobile radio receiver switched on for the first time in the mobile radio systems according to the UMTS standard (third-generation mobile telephony) has no information about the frequency and the time synchronization of the surrounding base stations. The mobile radio receiver must thus perform an initial cell search in order to determine the base station, the signals of which are received most strongly at it, and the associated time synchronization.

In the UMTS standard, the only known channel which is regularly transmitted by all base stations is the primary synchronization channel (pSCH). For this reason, both the time synchronization and the frequency synchronization are performed using this channel.

The time synchronization can only be performed when the mobile radio receiver knows the carrier frequency of the corresponding base station to the timing input of which synchronization is to take place.

The method according to the invention, therefore, has the object of firstly searching through the entire frequency band for the primary synchronization channel of the strongest received base station. For this purpose, the energy of the primary synchronization channels usually coming from different base stations is "measured", according to the invention, by the mobile radio receiver with the aid of correlators at the different carrier frequencies. To be able to perform this search in a quicker and simpler manner, it is proposed, according to the invention, to perform it with different resolution. Firstly, a coarse frequency synchronization is performed. After each such synchronization step, the range wherein most of the energy could be measured is again searched with a correspondingly finer resolution than during the preceding search.

The advantage of this performance of the frequency synchronization according to the invention lies in the fact that the time to be expended for correct synchronization to the primary synchronization channel of the strongest received base station is clearly reduced compared with conventional methods.

Due to the hardware implementation represented in the device claims and in the following description, it is also possible to use the same hardware components for different tasks. As a result, the circuit configuration of the mobile radio receiver can be considerably simplified.

In the text which follows, the present invention will be represented in all details. For this purpose, the principles of signal detection and tracking in a W-CDMA (wide-band code division multiple access) receiver will first be described. Following that, the detailed performance of the methods represented will be described.

In principle, the signal detection is split into three processing steps:

initial cell search;

cell search in idle mode; and cell search in active (call) mode.

The initial cell search after the mobile radio receiver has been newly switched on is performed non-coherently in the search devices of the mobile radio receiver. This measure is again split into three smaller method steps, namely determining the frequency and time synchronization;

frame synchronization and identification of the code group; and identification of the scrambling code.

The first of these steps will be described in detail below.

In the text which follows, the frequency determination and time synchronization will be described in detail.

The initial cell search procedure, which will be described below, must be carried out after the mobile receiver has been switched on or after the connection has been completely dropped. Apart from frequency and time synchronization, this process provides the sets of active and candidate base stations. The test of the hypothesis for determining both the frequency and the position of the time slots is based on a non-coherent correlation which will be called slot synchronization in the text which follows and which will be described first in the text which follows.

During the first step of the initial cell search process wherein only one of the two search devices provided according to the invention is active, the mobile receiver uses the primary synchronization channel pSCH for determining both the received carrier frequency and the time synchronization of the strongest received base station. This is done by means of non-coherent correlators which are tuned to the primary synchronization channel pSCH. The received signal is correlated with an in-phase (I) and quadrature (Q) component of 2560 chips with the primary synchronization code in order to find the beginning of a slot.

The output of the correlator will contain signal peaks for each propagation path for each of the base stations within range of the mobile receiver. A corresponding signal is shown in FIG. 1 at the bottom, the two peaks on the left come from a base station i, the signal of which propagates over two paths of different strength to the mobile receiver and the peak on the right comes from a base station j, the signal of which arrives only on one path. FIG. 1 at the top shows the individual method steps which are carried out with the received signal. Firstly, a correlation is performed in a correlator 10, the output signal of which is then shown at the bottom in FIG. 1. From this output signal, the period $T_{slot}$ of a slot can be determined. This provides for slot-per-slot accumulation. This measure is designated by 12. It is now only necessary to determine the maximum. After this maximum detection 14, the timing modulo $T_{slot}$ is known. Detection of the timing of the strongest peak provides the timing of the strongest received base station modulo the slot length $T_{slot}$. To improve the reliability of this method, the output signal of the correlator can be accumulated over a number of slots. According to the invention, the number of these slots can be set to between 1 and 16.

Since the initial received carrier frequency $f_c$ is unknown to the mobile receiver, the slot synchronization and testing of the hypothesis must be carried out for various assumptions with regard to the initial received frequency. To obtain both the received carrier frequency and the timing of the strongest received base station, an interative method as described in the text below is proposed according to the invention:

Starting with an initial received carrier frequency $f_c$, the slot synchronization generates, as described above, a hypothesis which is stored with a reference to the corresponding received carrier frequency $f_c$. The slot synchronization described above is then repeated in n iterations and the received carrier frequency is changed according to the formula:

$$f_{c,n} = f_c + (1 \text{ MHz}) \cdot n$$

until the entire frequency spectrum released for the corresponding mobile radio system has been fully searched.

Following this step, a test of the hypothesis is carried out to find the most probable candidate for the received carrier frequency $f_{c,h}$ with an accuracy of about ±200 kHz. Determining the frequency and slot synchronization is then carried out with a frequency change of in each case 100 kHz according to the formula:

$$f_{c,h,n} = f_{c,h} - 300 \text{ kHz} + (100 \text{ kHz}) \cdot n, \; n=1 \ldots 5.$$

Finally, the test of the hypothesis is carried out around a corrected most probable received carrier frequency $f_{c,hh}$ which is now already known with an accuracy of ±20 kHz, proceeding in accordance with the formula:

$$f_{c,hh,n} = f_{c,hh} - 30 \text{ kHz} + (10 \text{ kHz}) \cdot n, \; n=1 \ldots 5.$$

Once this first step of initial cell search procedure has been carried out, the received carrier frequency has been determined with sufficient accuracy and it has been possible to set up a time synchronization. Furthermore, the sets of active and candidate base stations have been identified. During this process, a division into the preferred base station which becomes a component of the set of active base stations, and all-other base stations has been performed which are initially allocated to the set of candidate base stations. The set of active base stations thus has one element whereas the set of candidate base stations can comprise 0 to 3 elements.

The preferred base station for which the second and third step of the initial cell search must now be concluded will be processed further hereafter by the first search device.

When the mobile receiver is in idle mode (switched on but without a mobile telephony call being conducted), it continuously searches for new base stations at the current and adjacent received carrier frequencies. This enables the mobile receiver continuously to update both the set of candidate base stations and the set of active base stations. The frequency with which this cell search is carried out in idle mode can be set in order to thus reduce the power consumption of the mobile radio receiver and to increase the standby time possible with one battery charge in this manner.

The cell search in idle mode is conducted in essentially the same manner as the initial cell search. Changing the received carrier frequency, however, is only permissible in slotted mode. The cell search procedure in idle mode thus comprises the following steps:

slot synchronization as described in the case of the initial cell search procedure, with the exception that a frequency search is only performed in slotted mode;

frame synchronization and code group identification are only carried out in the case where base stations which can be used as members in the set of active base stations have been identified in the abovementioned first step of idle mode cell search; and identification of the scrambling code for the base stations from the group of active base stations.

If the mobile receiver is in active mode, the mobile receiver continuously searches for new base stations at the current carrier frequency. The cell search is carried out exactly like the cell search in idle mode. The mobile receiver can also search for new base stations at other carrier frequencies if it uses the slotted mode. In the operating of a mobile radio system, it must always be assumed that the signals between base station and mobile receiver reach the mobile receiver from the base station over different continuously changing paths having different path delays. In such a time-variant multi-path channel, the channel impulse response must be estimated in order to facilitate a quasi-coherent demodulation in the RAKE receiver. Accordingly, the significant multi-path components must be continuously determined. For this reason, the following measures must be continuously carried out:

identification of significant multi-path components estimation of the associated path delays and estimation of the associated complex amplitudes In the text which follows, the configuration according to the invention of the circuits (hardware components) relevant to the determination of the carrier frequency of a mobile radio receiver according to the invention will be represented.

Figure 2:
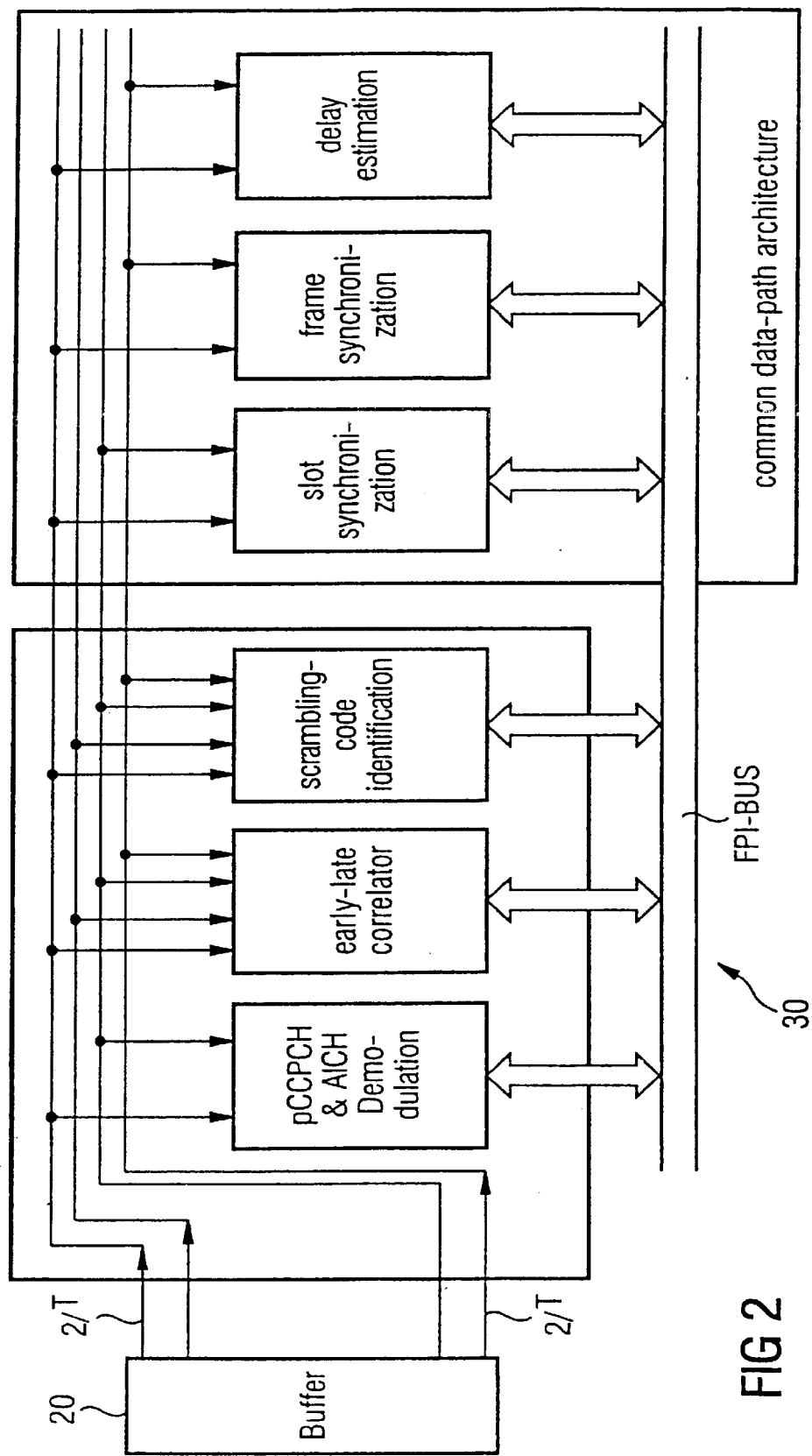
FIG. 2 shows a diagrammatic overview representation of a search device according to the invention.

FIG. 2 shows an overview of a search device of a mobile radio receiver according to the invention. A mobile radio receiver preferably comprises two such search devices on one chip. The search device 30 is connected to the same buffer 20 as the RAKE receiver. In the search device, the demodulation of the common physical control channel and of the acquisition indicator channel (AICH), the timing correlation, the identification of the scrambling code, the slot synchronization, the frame synchronization and the estimation of the path delay are effected. Slot synchronization, frame synchronization and delay estimation are implemented in a common data path as described in detail below.

FIG. 3 shows a simplified diagrammatic representation of the device according to the invention for determining the carrier frequency.

The radio frequency signal (RF) coming from the antenna 100 is supplied to the analog radio frequency receiver 102 which also carries out the RF conversion to analog broadband data (Brose+Brose).

These data are converted into digital broadband data in the signal mixer and converter unit 104. In this unit, signal mixing and analog/digital conversion are carried out. The digital broadband data are then supplied to the broadband signal processor 106, the structure and operation of which is represented below with reference to FIG. 4. The broadband signal processor 106 also controls the oscillator 108 which supplies the auxiliary frequency required for radio frequency conversion in the radio frequency section 102.

The structure of the broadband signal processor 106 is shown in detail in FIG. 4. The received digital broadband signal is supplied to a detection unit 110. This can be, for example, the fast correlator shown in FIG. 5. The detection results of this detection unit 110 are supplied to an evaluating unit 112 which, at the same time, contains an oscillator controller which supplies the control signals to the oscillator 108.

Structure and operation of the correlator to be used as detection unit 110 is explained below with regard to FIG. 5.

After the first and second step of the initial cell search, the information about the slot synchronization, frame synchronization and the local cell-relates code group (comprising 16 different scrambling codes) is available. Thus, the slot and frame counting based on the common physical primary control channel has begun.

During the first step of the initial cell search procedure, the mobile receiver uses the primary synchronization channel (pSCH) for achieving slot synchronization with the strongest received base station. This is done by fast correlation. Once the code for the primary synchronization channel (pSCH) has been generated from hierarchical correlation sequences, a two-step correlation is used for the slot synchronization.

Figure 5A:
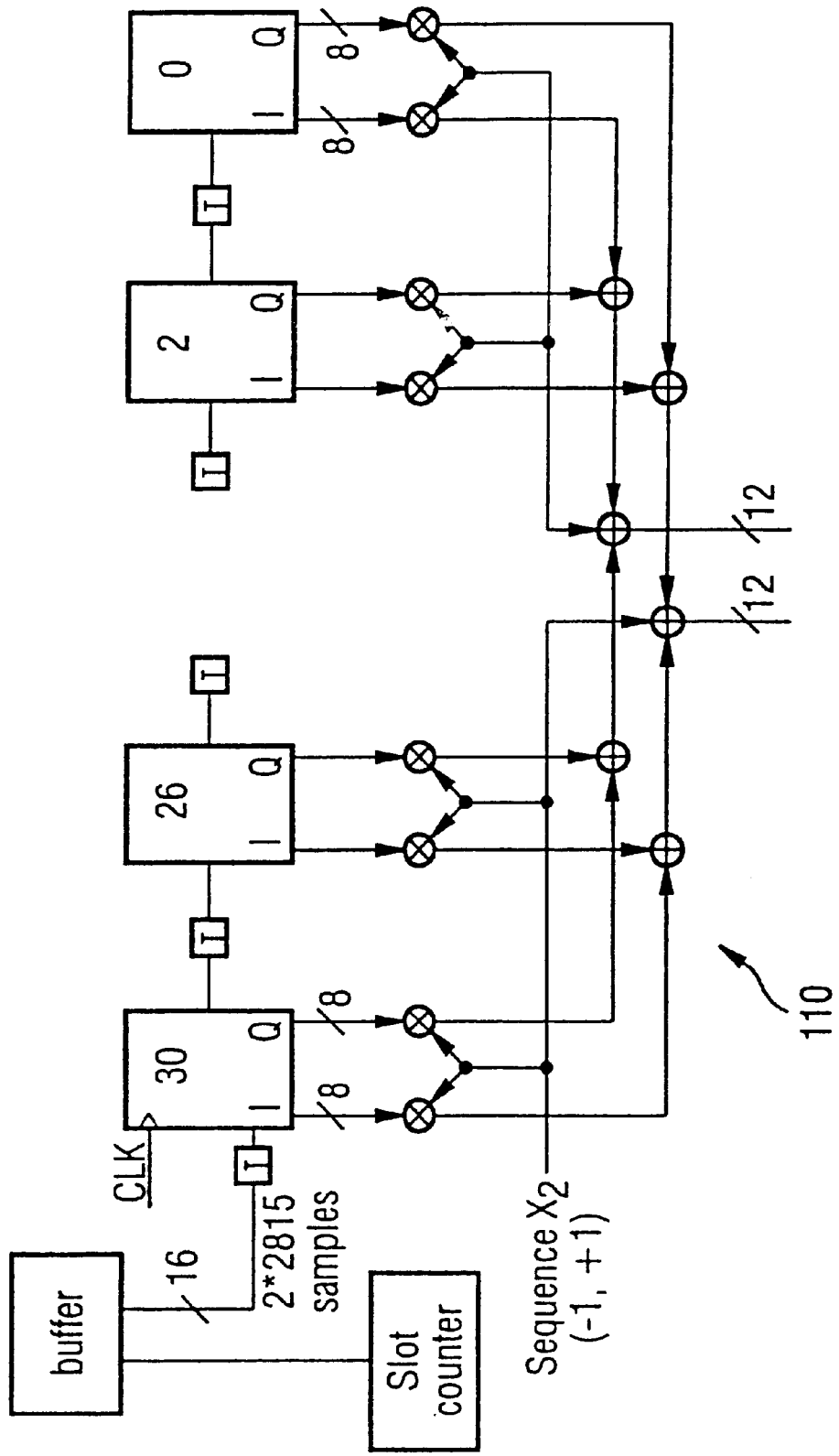
FIGS. 5A and 5B show an embodiment of the detector unit of FIG. 4 and are connected by multi-bit wires leaving FIG. 5A and entering FIG. 5B.
Figure 5B:
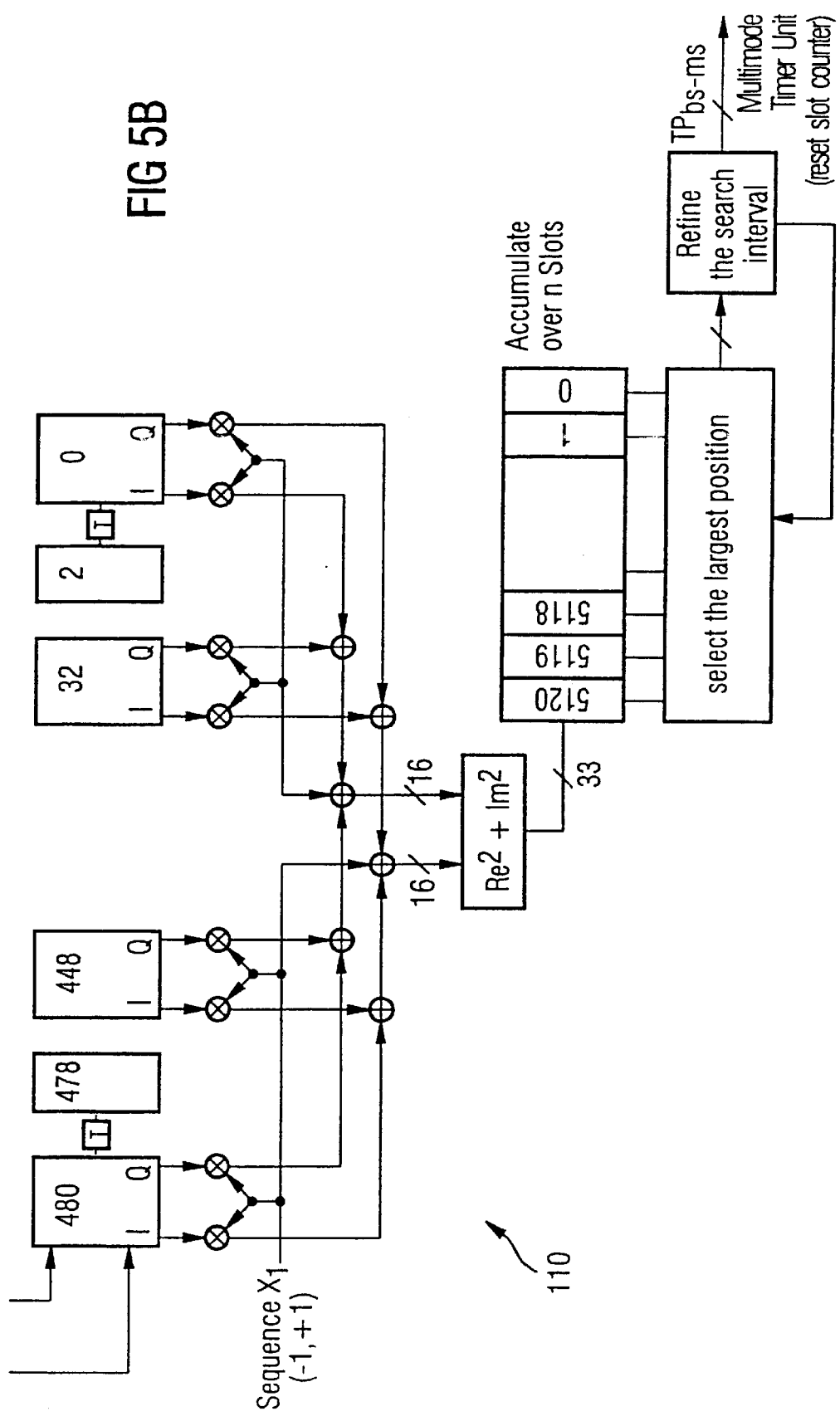

FIG. 5 shows an overview of this block. The output of the correlator has peaks for each beam of each base station within the range of the mobile receiver. Detection of the position of the strongest peak provides the timing of the strongest base station modulo the slot length. If $\underline{r}(i)$ is given as received signal and the in-phase and quadrature branch, the correlation values are built up in the following way:

$$P(k) = \left| \sum_{i=0}^{1} X_1(i) \cdot \left\{ \sum_{j=0}^{15} X_2(j) \cdot \underline{r}(16 \cdot i + j + k) \right\} \right|, k = 0 \ldots 2559$$

The received double-pattern signal in the in-phase (I) and quadrature (Q) branch is first inserted into a 32-step-long shift register. Each second pattern is correlated with the second sequence $X_2$ comprising 16 steps. The result of this calculation is transferred to a 482-step-long shift register. In this stage, only every thirty-second value is correlated with the first sequence $X_1$. The absolute value of the output signal of the second stage comprises one of the decision variables. The 5120 values obtained are accumulated over an adjustable number n of slots. This is done in order to obtain a more reliable estimation of the beginning of a slot since different base stations are transmitting the synchronization channel and the received strength of their signals can be time-variant at the mobile receiver.

In order to save computing time, it is also possible to reduce the correlation interval. After processing a number $n_1$ of slots and after reaching a coarse synchronization, the further correlation now only needs to be performed for a number M of patterns around the maximum value found.

The cell search functions like slot synchronization, frame synchronization, delay estimation on the basis of the primary synchronization channel PSCH and the delay estimation on the basis of the physical common primary control channel pCCPCH are based on similar arithmetic procedures such as, e.g. accumulation, forming the two's complement and root extraction.

Accordingly, the use of a central computing unit (searcher datapath) which can be used in time-division multiplex is proposed according to the invention. This computing unit searcher datapath is driven by finite state machines which supply the addresses of the input data, the addresses of the correlation values used, the control and enable signals for the datapath and the addresses of the intermediate results. There is a finite state machine for each of the abovementioned applications. The computing unit search datapath must be fast enough in order to realize slot synchronization in correspondence with the updating of the supply RAM (cyclic buffer). This means that the computing unit must have ended a subfunction which uses certain input values before these input values are updated in the cyclic buffer. Otherwise, the supply RAM (Random Access Memory) must be unnecessarily expanded. As an example, a supply RAM is taken which holds half a slot of data (3 k×16 bits). Once the supply RAM has been configured as cyclic buffer, the input data are updated after the time interval of half a slot. This means that slot synchronization must be established within the time interval of one slot.

We claim:

1. A method of determining a carrier frequency of base stations in a mobile receiver of a cellular mobile radio system working with W-CDMA, the method which comprises first searching for the carrier frequency of a primary synchronization channel and a time synchronization of the base stations by carrying out a non-coherent correlation of an in-phase component and quadrature component of a received signal with a primary synchronization code over a very large number of chips of the signal, searching for the primary synchronization channel in progressively less coarse frequency steps, by measuring an energy of the correlation result at intervals of a first frequency range in each case, then selecting a band having the highest energy and measuring at intervals of a second frequency range being smaller than the first frequency range in each case, then selecting a band having the highest energy and measuring at intervals of a third frequency range being smaller than the second frequency range in each case, and selecting a value having the highest energy as a hypothesis for the receiver carrier frequency.

2. The method according to claim 1, which comprises obtaining a time synchronization of a strongest received base station modulo a slot length by determining a maximum value of peaks in the output signal of the correlation.

3. The method according to claim 1, which comprises carrying out the correlation over 2560 chips of the signal.

4. The method according to claim 1, which comprises, after the carrier frequency of the primary synchronization channel and the time synchronization of the strongest received base station have been determined, determining a frame synchronization and a code group of the base station by way of a secondary synchronization channel.

5. A device for determining the carrier frequency of base stations for the mobile receiver of the cellular mobile radio system working with W-CDMA according to the method of claim 1, which comprises at least one search device having a device for demodulating a physical common primary control channel, a device for correlating various path delays, a device for identifying a scrambling code, a device for determining a time frame synchronization, and a device for estimating signal delay.

6. The device according to claim 5, wherein said at least one search device is one of two search devices.

7. A device for determining the carrier frequency of base stations for the mobile receiver of the cellular mobile radio system working with W-CDMA according to the method of claim 1, which comprises at least one search device having means for demodulating a physical common primary control channel, means for correlating various path delays, means for identifying a scrambling code, means for determining a time frame synchronization, and means for estimating the signal delay.

8. The method according to claim 1, wherein the first frequency range is approximately 1 MHz, the second frequency range is approximately 100 kHz, and the third frequency range is approximately 10 kHz.

* * * * *